United States Patent
Skudlark et al.

(10) Patent No.: US 9,584,989 B2
(45) Date of Patent: Feb. 28, 2017

(54) SYSTEM AND METHOD FOR CROWD-SOURCING MOBILE MESSAGING SPAM DETECTION AND DEFENSE

(71) Applicant: AT&T Intellectual Property I, L.P., Atlanta, GA (US)

(72) Inventors: Ann E. Skudlark, San Ramon, CA (US); Jeffrey Erman, Morristown, NJ (US); Yu Jin, Madison, NJ (US); Abhinav Srivastava, Edison, NJ (US); Lien K. Tran, Chatham, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 145 days.

(21) Appl. No.: 14/089,167

(22) Filed: Nov. 25, 2013

(65) Prior Publication Data

US 2015/0148006 A1 May 28, 2015

(51) Int. Cl.
| | |
|---|---|
| *H04M 1/66* | (2006.01) |
| *H04W 4/12* | (2009.01) |
| *H04W 4/00* | (2009.01) |
| *H04L 12/58* | (2006.01) |

(52) U.S. Cl.
CPC .............. *H04W 4/12* (2013.01); *H04L 51/12* (2013.01); *H04W 4/001* (2013.01)

(58) Field of Classification Search
None
See application file for complete search history.

(56) References Cited

U.S. PATENT DOCUMENTS

| | | |
|---|---|---|
| 6,769,016 B2 | 7/2004 | Rothwell et al. |
| 7,475,118 B2 | 1/2009 | Leiba et al. |
| 7,574,409 B2 | 8/2009 | Patinkin |

(Continued)

OTHER PUBLICATIONS

Kuldeep Yadav, et al.; "Take Control Over your SMSes: A Real-World Evaluation of a Mobile-based Spam SMS Filtering System"; IIIT-D Technical Report; May 14, 2012; pp. 1-11; Indraprastha Institute of Information Technology (IIIT), Delhi, India.

(Continued)

*Primary Examiner* — Suhail Khan
(74) *Attorney, Agent, or Firm* — Chiesa Shahinian & Giantomasi PC (57) ABSTRACT

A crowd-sourced mobile messaging spam detection and defense system includes an application running on a mobile device. The application uses an unwanted message detection algorithm to analyze and classify messages as potential unwanted messages. The potential unwanted messages are presented to a user for confirmation that the messages are unwanted messages. In response to confirmation, the mobile device transmits a notification to a virtual machine associated with the user. The virtual machine uses the notification to update the unwanted message detection algorithm which may then be transmitted to the mobile device. The virtual machine may also transmit the notification to a global virtual machine. The global virtual machine may use the notification to update a set of classification rules maintained by the global virtual machine and transmit the set of classification rules as necessary to the multiple virtual machines for use in updating the unwanted message detection algorithm.

13 Claims, 4 Drawing Sheets

(56) References Cited

U.S. PATENT DOCUMENTS

| | | |
|---|---|---|
| 7,797,379 B2 | 9/2010 | Hawkins |
| 7,891,001 B1 | 2/2011 | Greenawalt et al. |
| 7,917,655 B1 | 3/2011 | Coomen et al. |
| 8,150,779 B1 | 4/2012 | Gauvin |
| 8,190,686 B2 | 5/2012 | Qutub et al. |
| 8,214,437 B1 * | 7/2012 | Alspector ......... G06F 17/30707 709/200 |
| 8,325,900 B2 | 12/2012 | Trivi et al. |
| 8,458,262 B2 | 6/2013 | Mikan et al. |
| 8,479,289 B1 | 7/2013 | Krishnappa et al. |
| 8,495,727 B2 | 7/2013 | Ramanathan et al. |
| 8,495,737 B2 | 7/2013 | Sinha et al. |
| 2005/0278620 A1 * | 12/2005 | Baldwin et al. .............. 715/513 |
| 2006/0095966 A1 | 5/2006 | Park |
| 2009/0178132 A1 | 7/2009 | Hudis et al. |
| 2010/0257605 A1 | 10/2010 | McLaughlin et al. |
| 2011/0179487 A1 | 7/2011 | Lee |
| 2012/0224694 A1 | 9/2012 | Lu et al. |
| 2012/0233694 A1 * | 9/2012 | Baliga et al. ................... 726/23 |
| 2012/0240183 A1 | 9/2012 | Sinha |
| 2013/0074159 A1 | 3/2013 | Lin et al. |
| 2014/0199975 A1 * | 7/2014 | Lou ....................... H04W 4/001 455/414.1 |

OTHER PUBLICATIONS

Nan Jiang, et al.; "Greystar: Fast and Accurate Detection of SMS Spam Numbers in Large Cellular Networks using Grey Phone Space"; Proceedings of the 22nd USENIX Security Symposium; Aug. 14-16, 2013; pp. 1-16; Washington, D.C.

Enrico Blanzieri, et al.; "A Survey of Learning-Based Techniques of Email Spam Filtering"; Technical Report #DIT-06-056; Jan. 11, 2008; pp. 1-29; University of Trento, Italy.

* cited by examiner

SYSTEM AND METHOD FOR CROWD-SOURCING MOBILE MESSAGING SPAM DETECTION AND DEFENSE

BACKGROUND

The present disclosure relates generally to telecommunications, and more particularly to crowd-sourcing mobile messaging spam detection and defense.

Mobile devices have become a ubiquitous means of communication. Cell phones are estimated to be at near 100% penetration in the United States, with approximately half of these devices being smart phones. Globally, 1.6 billion mobile phones and 66.9 million tablets were in use in 2011. This increase in the use of mobile devices leads to an increase of communication via Short Messaging Service (SMS) and Internet Protocol Messaging (IP-messaging). These increases also allow for more mobile messaging exploits and abuses. In 2011, SMS spam rose 45% to 4.5 billion messages. Approximately 69% of mobile users have received text spam (also referred to as unwanted messages) in 2012 according to some accounts. In addition, the proliferation of IP Based Text via Over-the-top messaging applications brings further growing vulnerability to mobile customers. In 2010, many social networking users unwittingly and unknowingly spread spam when clicking on the "LOL is this you" messages. In 2012, many microblog users became victims of direct message malware. The spam perpetrators often extract personal and financial information from victims. They may trick victims into unknowingly signing up for expensive services and/or downloading malware which converts their device into a spambot.

Among various existing SMS spam detection mechanisms, customer SMS reports (i.e., victims forwarding spam text received to a particular phone number designated by their carriers) are utilized by major cellular carriers as the major tool or as the major input to other defense methods to fight against SMS spam. However, the customer awareness is limited on how to report SMS spam, and even for those who know about it, and use it, the manual two-step text forward to a phone number is both tedious and error-prone. This results in an extremely low SMS report rate and hence a significant detection delay in all the algorithms which rely on customer SMS reports as an input.

Spam reporting in IP-based messaging applications varies from application to application if it is available. As such, the spam reporting mechanism predicates that users know how to report spam for each messaging application.

SUMMARY

This disclosure addresses the problems in existing solutions by crowd-sourcing the detection and reporting of all mobile messaging spam, including SMS and IP based messaging spam, to end users with a user friendly and comprehensive spam detection and reporting methodology. In one embodiment, a customer opt-in application (also referred to as "app") running on mobile devices monitors incoming mobile messages and performs early detection of spam messages using a customized detection algorithm. The app interacts with a crowd-sourcing engine in the cloud to report on detected spam and to receive updates to its customized spam detection algorithm.

In one embodiment, a method comprises receiving a notification at a virtual machine from a mobile device associated with a particular user. The notification identifies a message received at the mobile device that has been determined to be an unwanted message based on an identification of the message as a potential unwanted message by an unwanted message detection algorithm. A copy of the unwanted message detection algorithm is updated at the virtual machine associated with the particular user based on the notification to generate an updated unwanted message detection algorithm. The updated unwanted message detection algorithm is transmitted to a user device.

In one embodiment, the updating an unwanted message detection algorithm is further based on a set of personalized classification rules. The set of personalized classification rules may be defined by the particular user.

In one embodiment, an updated set of global classification rules is received from the global virtual machine is used to update the unwanted message detection algorithm. The updated set of global classification rules is based on notifications from a plurality of user devices associated with the global virtual machine. The set of global classification rules is updated based on information pertaining to the notification transmitted to the global virtual machine. The notification may be generated by an application on the mobile device which analyzes messages received by the mobile device using the unwanted message detection algorithm. In one embodiment, the message is confirmed by the particular user to be an unwanted message based on a response by the particular user presented with the message and requesting confirmation of the message as an unwanted message. A set of personalized classification rules associated with a particular user may comprise identifiers identifying contacts associated with the particular user.

A system and computer readable medium for crowd-sourcing mobile messaging spam detection and defense are also described herein.

DETAILED DESCRIPTION

Figure 1:
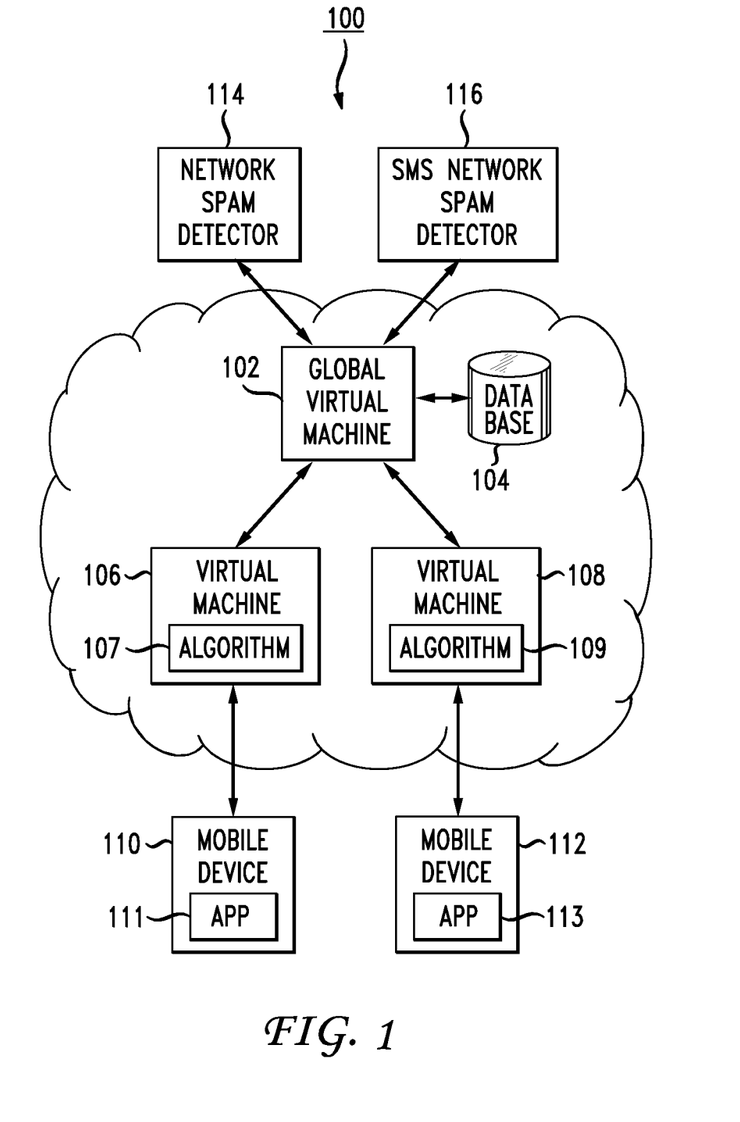
FIG. 1 depicts a system for crowd-sourcing mobile messaging spam detection and defense.

FIG. 1 depicts a system 100 for crowd-sourcing mobile messaging spam detection and defense. A mobile application (also referred to as mobile app or app) runs silently on a mobile device (i.e., runs constantly on a mobile device with little or no impact on other application and processes running on the device). The app analyzes mobile messages as they arrive at the mobile device and determines if a mobile message is spam using a statistical machine learning technique using user specific data. If the app classifies a message as spam, the user will be prompted to confirm that message is spam and a notification is sent from the mobile device to a virtual machine associated with, and customized for, a particular user associated with the mobile device. This notification, along with similar notifications from other mobile devices associated with other users, are then transmitted to a global virtual machine and used to update a set of global classification rules associated with the global virtual machine. As such, information concerning spam is crowd sourced from a plurality of users. The updated set of global classification rules may then be transmitted from the global virtual machine to each of a plurality of virtual machines, each virtual machine associated with a particular user device and customized for a particular user associated with the particular user device.

FIG. 1 depicts mobile devices 110, 112 each of which is associated with a particular user. Mobile devices 110, 112 may be any type of mobile device capable of receiving messages such as SMS messages, messages associated with chat programs, and other messages associated with various applications and/or programs. Mobile devices 110, 112 may be smart phones, cell phones, hand-held computers, tablets, etc. Mobile devices 110, 112 each execute an app 111, 113, respectively, for analyzing messages received to determine if the messages are spam. The application runs silently on a respective mobile device and presents a user with a prompt asking the user to confirm that a particular message is spam in response to the message being classified as spam.

Mobile devices 110, 112 are each in communication and associated with a respective virtual machine 106, 108 which are located in a cloud remote from mobile devices 110, 112. Virtual machines 106,108 each store and maintain unwanted message detection algorithms 107, 109. As used herein, a "cloud" is a collection of resources located separate from other devices, such as mobile devices 110, 112. Resources in a cloud can comprise one or more computing devices. As used herein, a virtual machine is a program or application that appears to be an individual resource but is actually a program designed to operate as an individual resource, such as a computer, on a resource. As shown in FIG. 1, virtual machine 106 is in communication with mobile device 110 and virtual machine 112 is in communication with mobile device 108.

Each virtual machine 106, 108 is in communication with global virtual machine 102 which receives information from virtual machines 106, 108 concerning unwanted messages (i.e., spam). In one embodiment, virtual machines 106, 108 and global virtual machine 102 are located on the same hardware resource and communicate with one another within the confines of the hardware resource. In one embodiment, virtual machines 106, 108 operate on hardware different from hardware on which global virtual machine 102 operates. In such embodiments, virtual machines 106, 108 and global virtual machine 102 communicate with one another via any communication protocol and medium. In one embodiment, global virtual machine 102 and virtual machines 106, 108 each reside on a different hardware resource. In such an embodiment, global virtual machine 102 and virtual machines 106, 108 communication with one another via any communication protocol and medium. It should be noted that various combinations of machines and hardware may be used to implement global virtual machine 102 and virtual machines 106, 108.

Global virtual machine 102 compiles information concerning unwanted messages (e.g., a set of global classification rules) based on information received from mobile devices 110, 112 as well as additional mobile devices (not shown). Global virtual machine 102 is in communication with database 104 which stores the information concerning unwanted messages compiled by global virtual machine 102. Global virtual machine 102 is in communication with a network spam detector 114 and an SMS network spam detector 116. In one embodiment, network spam detector 114 is an existing network spam detector that global virtual machine 102 is configured to communicate with. In such embodiments, information determined by, or communicated to, global virtual machine 102 may be transmitted to the existing network spam detector in an appropriate format.

Figure 2A:
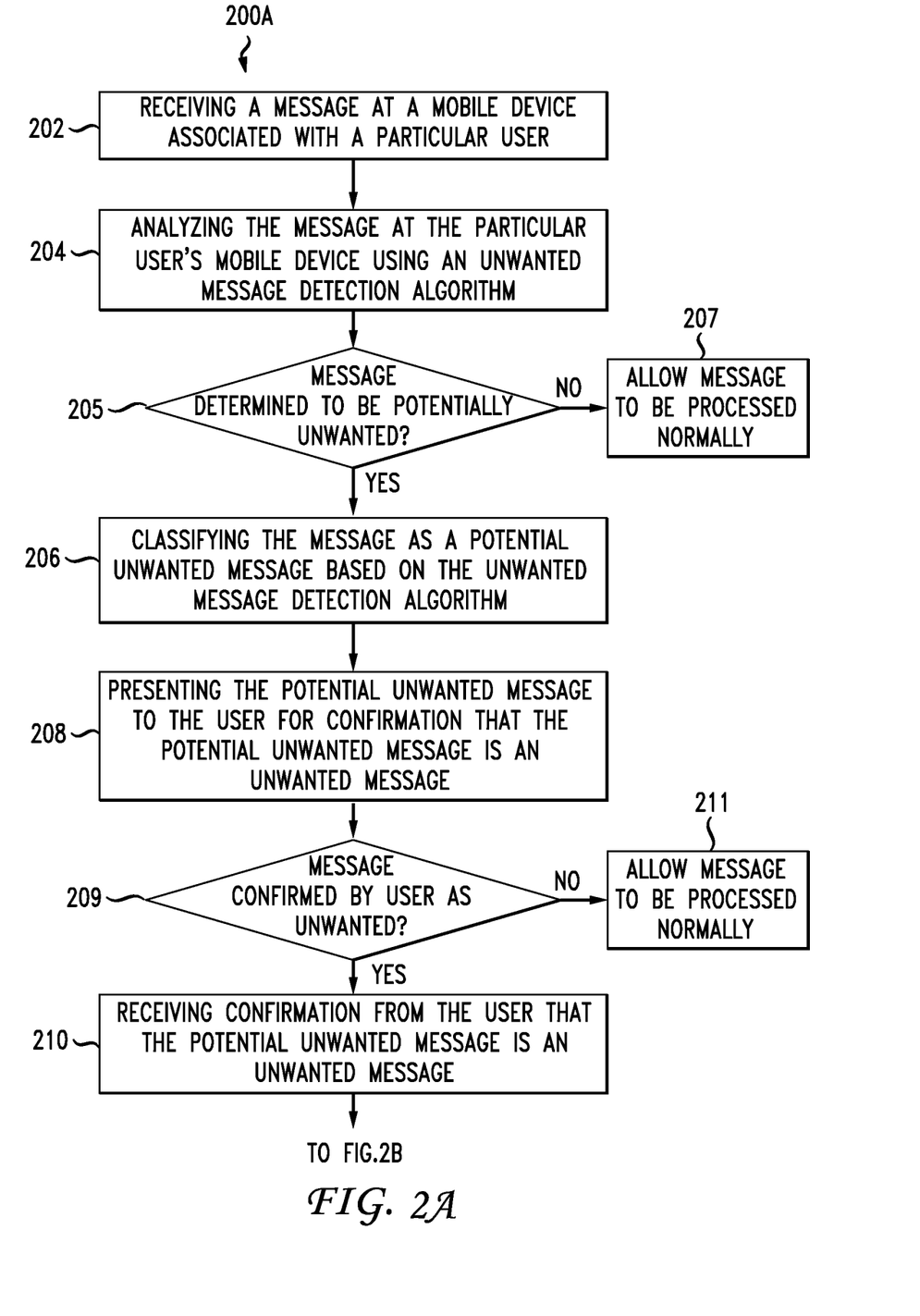
FIG. 2A depicts a flowchart of a method for crowd-sourcing mobile messaging spam detection and defense performed by a mobile device.

FIG. 2A depicts a flow chart of a method 200A performed by mobile device 110 according to one embodiment. At step 202 a message is received at mobile device 110, the mobile device associated with a particular user. The message can be any type of message that is received at mobile device 110. In one embodiment, the message is a text message. The message can also be a short message service message. In another embodiment, the message is transmitted and received via a particular program or application. For example, the message may be sent and received via a social networking service or micro blogging service.

At step 204, the message is analyzed at the particular user's mobile device 110 using an unwanted message detection algorithm. The unwanted message detection algorithm is part of an application that runs silently on the particular user' mobile device (i.e., the application runs in the background) and analyzes incoming messages. More specifically, when a message arrives, the application uses a statistical machine learning technique with user specific data (e.g., a set of personalized classification rules) and general data (e.g., a set of global classification rules) to classify the message.

At step 205 a decision is made based on whether the message is determined to be potentially unwanted. If the message is determined to not be potentially unwanted, the method continues to step 207 where the message is allowed to be processed normally and method 200A ends. If the message is determined to be potentially unwanted, the method continues to step 206.

At step 206, mobile user device 110 classifies the message as a potential unwanted message based on the unwanted message detection algorithm. In one embodiment, the classification is based on a set of personalized classification rules and a set of global classification rules received from global virtual machine 102. The set of personalized classification rules, in one embodiment, comprises information pertaining to a list of contacts for a particular user and previous confirmation of unwanted messages by the particular user. In other embodiments, the set of personalized classification rules can be based on a white list, unsolicited messages from outside a contact circle and/or date/time a message is sent or received. The set of personalized classification rules, in one embodiment can be based on information mined through associate rule mining or other techniques. In one embodiment, the set of personalized classification rules can be generated and/or modified by a user. The set of global classification rules are rules that can be used to determine if a message is a potentially unwanted message. In one embodiment, the set of global classification rules are based on one or more features such as a blacklist, message content, an identity of a message sender, date/time a message is sent or received, etc. The set of global classification rules, in one embodiment can be based on information mined through associate rule mining or other techniques. In one embodiment, training messages for generating the set of global classification rules can be based on messages received via crowd-sourcing (e.g., messages identified as spam by other users of the system). If mobile user device 110 determines that the message may be an unwanted message, the message is classified as a potential unwanted message and a user may be prompted for confirmation.

At step 208, in response to a message being classified as a potential unwanted message (i.e., the message is classified as spam), the app will present the potential unwanted message to the user for confirmation that the potential unwanted message is indeed an unwanted message. In one embodiment, the application may present the message to the user for confirmation upon classification of the message as a potential unwanted message. For example, upon classification as a potential unwanted message, the app may present the message immediately to a user for review. Presenting the message for review, in one embodiment, includes presenting the user with the phrase "Confirm as unwanted message?" along with "yes" and "no" buttons for a user to select.) In another embodiment, a message classified as a potential unwanted message may be placed in a folder, such as a potential unwanted message folder. Potential unwanted messages placed in the potential unwanted message folder may be then be reviewed by a user at a time of the user's choosing. In one embodiment, the potential unwanted message may be presented to a user for review with additional information based on analysis of the message. For example, keywords, the identity of the sender, the date/time the message was sent or received, or other information associated with the message may be highlighted to indicate what factors were considered in identifying the message as a potential unwanted message.

At step 209 a decision is made based the user input received in step 208. At step 209, if a message is not confirmed by the user as unwanted, the method proceeds to step 211 where the message is allowed to be processed normally and method 200A ends. If the message is confirmed by the user as unwanted, the method proceeds to step 210.

At step 210, mobile user device 110 receives confirmation from the user that the potential unwanted message is an unwanted message. It should be noted that if a user indicates that the potential unwanted message is not an unwanted message (e.g., the user selects "No" in response to the phrase "Confirm as unwanted message?"), the message is not classified as an unwanted message and the message will not be blocked by the unwanted message algorithm and normal treatment of the message by other applications and/or programs is allowed to occur. Messages that are not classified as unwanted messages may be processed normally by the applications from which those messages originate. In one embodiment, user input in response to step 208 is received indicating that the potential unwanted message is an unwanted message by the user selecting the "Yes" button in response to the phrase "Confirm as unwanted message?" If a user indicates that a potential unwanted message is an unwanted message, then information pertaining to the unwanted message is used to update the unwanted message detection algorithm as well as other algorithms and lists. In one embodiment, information pertaining to the unwanted message is sent from mobile device 110 to virtual machine 106 in the form of a notification. After step 210, the method proceeds to the method depicted in FIG. 2B.

Figure 2B:
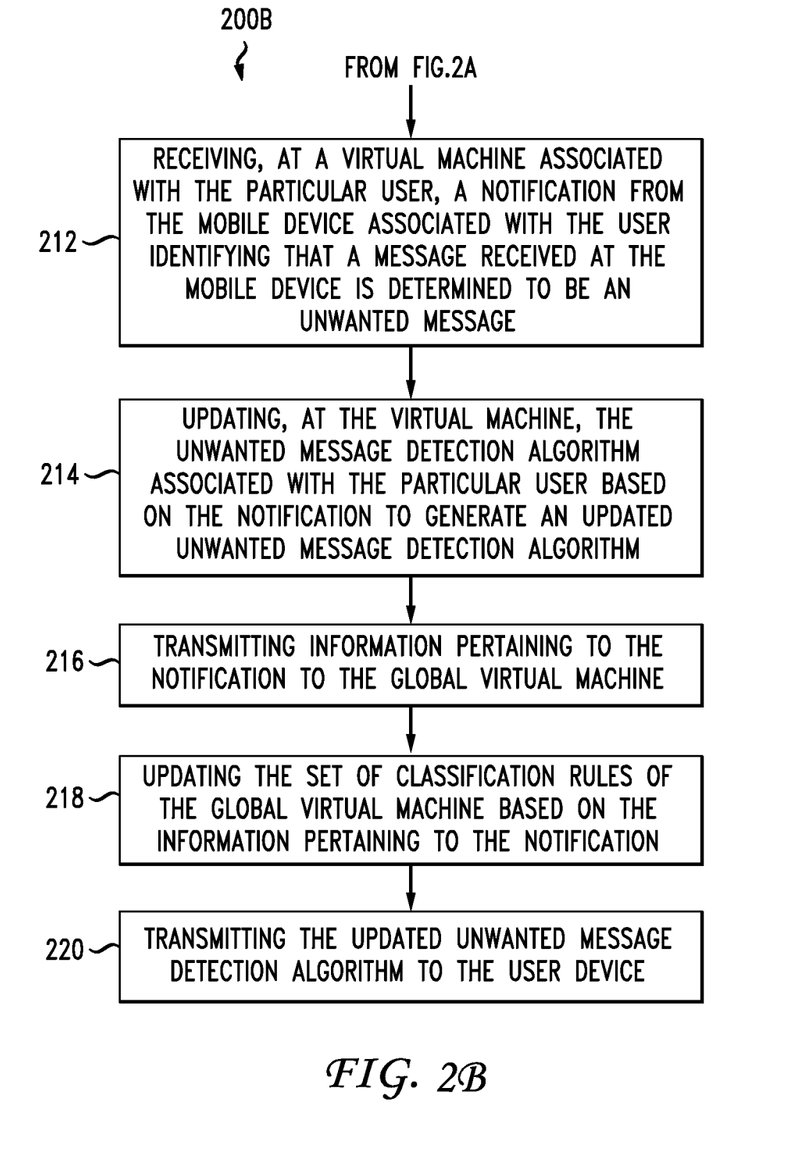
FIG. 2B depicts a flowchart of a method for crowd-sourcing mobile messaging spam detection and defense performed by a virtual machine.

FIG. 2B depicts a flow chart of a method 200B performed by virtual machine 106 according to one embodiment. At step 212, virtual machine 106 associated with the particular user of mobile device 110 receives the notification from mobile device 110 associated with the user identifying that a message received at the mobile device is determined to be an unwanted message. In one embodiment, the notification contains information about the unwanted message. For example, in one embodiment, the notification identifies the sender of the message and the recipient or recipients of the message. In one embodiment, the notification may include the subject of the message and a portion or all of the content of the message.

At step 214, in one embodiment, virtual machine 106 updates unwanted message detection algorithm 107 associated with the particular user based on the notification sent to virtual machine 106 from mobile device 110. The updating generates an updated unwanted message detection algorithm. In one embodiment, the identity of the sender of the unwanted message may be added to a rule of the set of personalized classification rules identifying the sender as sending unwanted messages. In one embodiment, a term or phrase used in the unwanted message may be used to update a rule of the set of personalized classification rules pertaining to terms and phrases commonly found in unwanted messages. In one embodiment, the recipients of an unwanted message, and in some cases, the number of the recipients, may be used to update a rule of the set of personalized classification rules pertaining to a list of recipients of unwanted messages. For example, a message may be classified as unwanted by the unwanted message detection algorithm based on the number of recipients associated with a message. The notification, and/or information contained in the notification, may be sent from virtual machine 106 to global virtual machine 102.

At step 216, virtual machine 106 transmits the notification, and/or information pertaining to the notification, to global virtual machine 102. In one embodiment, the same notification transmitted from mobile device 110 associated with the particular user is transmitted from the virtual machine 106 to global virtual machine 102. In one embodiment, only a portion of the information contained in the notification sent from mobile device 110 to virtual machine 102 is transmitted to global virtual machine 102. For example, in one embodiment, only an identification of the sender of the unwanted message and a portion of the content of the message is transmitted to global virtual machine 102. Global virtual machine 102 then utilizes the information pertaining to the notification for one or more operations.

At step 218, global virtual machine 102, in one embodiment, updates a set of global classification rules based on the information pertaining to the notification. In one embodiment, the set of global classification rules of global virtual machine 102 is stored in database 104. In one embodiment, the set of global classification rules comprises rules pertaining to a list of senders who have been determined to transmit unwanted messages. In other embodiments, additional information, such as content of unwanted messages may be stored in database 104 and considered in generation and update of the set of global classification rules. For example, messages determined to be unwanted messages from an unknown sender containing certain text may be used to add the unknown sender's address and portion of the text to one or more rules of the set of global classification rules. The set of global classification rules may then be integrated into unwanted message detection algorithm 107 to classify messages received by mobile device 110.

At step 220, the updated unwanted message detection algorithm is transmitted from virtual machine 106 to mobile device 110. It should be noted that the transfer of information between user devices 110, 112, virtual machines 106, 108, global virtual machine 102, network spam detector 114, and SMS network spam detector 116 allows the system to generate and update both the set of personalized classification rules and the set of global classification rules to provide each user with an unwanted message detection algorithm containing the most up to date information concerning unwanted messages. In one embodiment, this transfer of information results in reinforcement learning between virtual machines, 106, 108 and global virtual machine 102 to create a comprehensive set of rules to classify messages as potential unwanted messages.

It should be noted that a particular message may be considered spam by some users but not by others. For example, a particular message containing an advertisement may be considered an unwanted message by a particular user. In this case, the set of personalized classification rules associated with the particular user may be updated to classify messages from a sender associated with the particular message as spam. In addition, the set of global classification rules may be updated to reflect the classification of the particular message as spam by the particular user. However, not all users may consider the particular message as spam. As such, the set of global classification rules may not be updated to classify messages from the sender associated with the particular message as spam based on a single classification of the particular message as spam by a user. Accordingly, users who have not classified the particular message as spam will receive the particular message and continue to receive messages from the sender associated with the particular message. In one embodiment, the set of global classification rules is updated to classify specific messages as unwanted messages based on various factors such as how many users identified a particular message as spam, the volume of messages similar to the specific message sent, and/or whether a message has characteristics of other known unwanted messages.

It should be noted that the set of personalized classification rules and global classification rules may be configured in various way to classify specific messages as spam for some users but not for others. In addition, although the sender of a particular message is used to classify other messages as spam in the embodiments previously described, other criteria, such as keywords in a message and/or time/date of the transmission/receipt of a message, etc., may be used to classify a message as spam as well.

It should be noted that each of mobile device 110, virtual machine 106 and global virtual machine 102 could generate and or update an unwanted message detection algorithm. Generation and updating of the unwanted message detection algorithm can require an amount of processing power not necessarily available on some devices, such as mobile device 110. In one embodiment, generation and updating of the unwanted message detection algorithm is performed by virtual machine 106 and transmitted to mobile device 110. As such, the necessary processing power to complete the generation and/or update of the unwanted message algorithm can be allocated to virtual machine 106. Similarly, the generation and/or update of the unwanted message algorithm may be performed by global virtual machine 102. In either case, the processing power required from mobile device 110 is reduced by moving the required proceeding to virtual machine 106 or global virtual machine 102.

The steps shown in FIG. 2, in one embodiment, are repeated each time a message is received by mobile device 110 associated with a particular user. It should be noted that the unwanted message algorithm on mobile device 110 can be configured to access and retrieve messages for a particular user from various applications and/or programs. In one embodiment, a user provides their user name and password for each application and/or program that the user wants the unwanted message algorithm to review messages. For example, the user may provide their username and password for a social networking application and the unwanted message algorithm then uses this information to log into the user's account for the social networking platform to obtain messages for analysis and classification.

Figure 3:
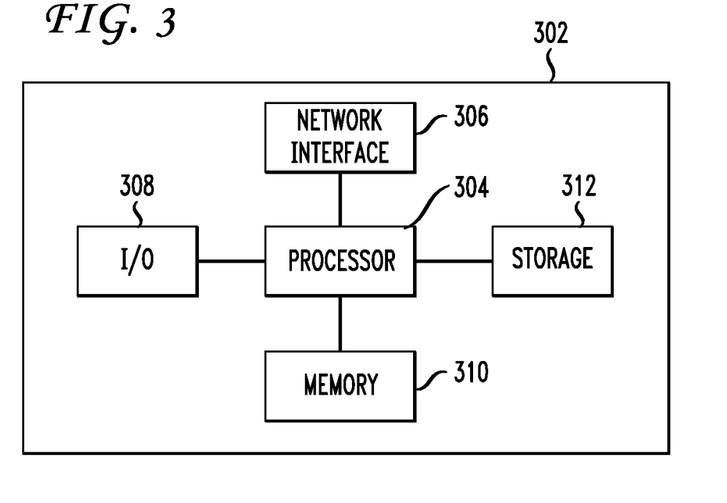
FIG. 3 depicts a high-level block diagram of a computer for crowd-sourcing mobile messaging spam detection and defense according to one embodiment.

Mobile devices 110, 112, virtual machines 106, 108, global virtual machine 102, network spam detector 114, and SMS network spam detector 116 may each be implemented using a computer. A high-level block diagram of such a computer is illustrated in FIG. 3. Computer 302 contains a processor 304 which controls the overall operation of the computer 302 by executing computer program instructions which define such operation. The computer program instructions may be stored in a storage device 312, or other computer readable medium (e.g., magnetic disk, CD ROM, etc.), and loaded into memory 310 when execution of the computer program instructions is desired. Thus, the method steps of FIG. 2 can be defined by the computer program instructions stored in the memory 310 and/or storage 312 and controlled by the processor 304 executing the computer program instructions. For example, the computer program instructions can be implemented as computer executable code programmed by one skilled in the art to perform an algorithm defined by the method steps of FIG. 2. Accordingly, by executing the computer program instructions, the processor 304 executes an algorithm defined by the method steps of FIG. 2. The computer 302 also includes one or more network interfaces 306 for communicating with other devices via a network. The computer 302 also includes input/output devices 308 that enable user interaction with the computer 302 (e.g., display, keyboard, mouse, speakers, buttons, etc.) One skilled in the art will recognize that an implementation of an actual computer could contain other components as well, and that FIG. 3 is a high level representation of some of the components of such a computer for illustrative purposes.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

The invention claimed is:

1. A method comprising:
   receiving, at a virtual machine associated with a particular user, a notification from a mobile device associated with the particular user identifying that a message received at the mobile device is determined to be an unwanted message based on:
   identification of the message as a potential unwanted message by an unwanted message detection algorithm; and
   the message being confirmed by the particular user to be the unwanted message in response to presenting the particular user with the message, the message presented with a date and time the message was sent highlighted to indicate that the date and time were considered in identifying the message as the potential unwanted message;
   transmitting information pertaining to the notification to a global virtual machine;

receiving an updated set of global classification rules from the global virtual machine, the updated set of global classification rules based on information pertaining to the notification, information pertaining to notifications from a plurality of other user devices associated with the global virtual machine, a number of users that identified a particular message as unwanted, and information pertaining to training messages;

updating, at the virtual machine, a copy of the unwanted message detection algorithm associated with the particular user, based on the notification, the updated set of global classification rules, and a set of personalized classification rules, the updating to generate an updated copy of the unwanted message detection algorithm; and transmitting the updated copy of the unwanted message detection algorithm to the mobile device associated with the particular user.

2. The method of claim 1, wherein the notification is generated by an application on the mobile device associated with the particular user, the application analyzing messages received by the mobile device using the unwanted message detection algorithm.

3. The method of claim 1 wherein the set of personalized classification rules comprises a rule pertaining to contacts associated with the particular user.

4. The method of claim 1, wherein the virtual machine is one of a plurality of virtual machines, each of the plurality of virtual machines associated with a respective user.

5. The method of claim 1, wherein the updated copy of the unwanted message detection algorithm identifies the particular message as not being a potentially unwanted message in response to the particular message being identified by the set of personalized classification rules as not being a potentially unwanted message and the particular message being identified by the updated set of global classification rules as being a potentially unwanted message.

6. An apparatus comprising:
a processor; and
a memory to store computer program instructions, the computer program instructions when executed on the processor cause the processor to perform operations comprising:
  receiving a notification from a mobile device associated with a particular user identifying that a message received at the mobile device is determined to be an unwanted message based on:
    identification of the message as an unwanted message by an unwanted message detection algorithm; and
    the message being confirmed by the particular user to be the unwanted message in response to presenting the particular user with the message, the message presented with a date and time the message was sent highlighted to indicate that the date and time were considered in identifying the message as the potential unwanted message;
  transmitting information pertaining to the notification to a global virtual machine;
  receiving an updated set of global classification rules from the global virtual machine, the updated set of global classification rules based on information pertaining to the notification, information pertaining to notifications from a plurality of other user devices associated with the global virtual machine, a number of users that identified a particular message as unwanted, and information pertaining to training messages;
  updating a copy of the unwanted message detection algorithm associated with the particular user, based on the notification, the updated set of global classification rules, and a set of personalized classification rules, the updating to generate an updated copy of the unwanted message detection algorithm; and
  transmitting the updated copy of the unwanted message detection algorithm to the mobile device associated with the particular user.

7. The apparatus of claim 6, wherein the notification is generated by an application on the mobile device associated with the particular user, the application analyzing messages received by the mobile device using the unwanted message detection algorithm.

8. The apparatus of claim 6 wherein the set of personalized classification rules comprises a rule pertaining to contacts associated with the particular user.

9. The apparatus of claim 6, wherein the updated copy of the unwanted message detection algorithm identifies the particular message as not being a potentially unwanted message in response to the particular message being identified by the set of personalized classification rules as not being a potentially unwanted message and the particular message being identified by the updated set of global classification rules as being a potentially unwanted message.

10. A non-transitory computer readable medium storing computer program instructions, which, when executed on a processor, cause the processor to perform operations comprising:
  receiving, at a virtual machine associated with a particular user, a notification from a mobile device associated with the particular user identifying that a message received at the mobile device is determined to be an unwanted message based on:
    identification of the message as a potential unwanted message by an unwanted message detection algorithm; and
    the message being confirmed by the particular user to be the unwanted message in response to presenting the particular user with the message, the message presented with a date and time the message was sent highlighted to indicate that the date and time were considered in identifying the message as the potential unwanted message;
  transmitting information pertaining to the notification to a global virtual machine;
  receiving an updated set of global classification rules from the global virtual machine, the updated set of global classification rules based on information pertaining to the notification, information pertaining to notifications from a plurality of other user devices associated with the global virtual machine, a number of users that identified a particular message as unwanted, and information pertaining to training messages;
  updating, at the virtual machine, a copy of the unwanted message detection algorithm associated with the particular user, based on the notification, the updated set of global classification rules, and a set of personalized classification rules, the updating to generate an updated copy of the unwanted message detection algorithm; and
  transmitting the updated copy of the unwanted message detection algorithm to the mobile device associated with the particular user.

11. The non-transitory computer readable medium of claim 10, wherein the notification is generated by an application on the mobile device associated with the particular user, the application analyzing messages received by the mobile device using the unwanted message detection algorithm.

12. The non-transitory computer readable medium of claim 10, wherein the virtual machine is one of a plurality of virtual machines, each of the plurality of virtual machines associated with a respective user.

13. The non-transitory computer readable medium of claim 10, wherein the updated copy of the unwanted message detection algorithm identifies the particular message as not being a potentially unwanted message in response to the particular message being identified by the set of personalized classification rules as not being a potentially unwanted message and the particular message being identified by the updated set of global classification rules as being a potentially unwanted message.

* * * * *